United States Patent
Barnwal et al.

(10) Patent No.: US 9,063,562 B2
(45) Date of Patent: Jun. 23, 2015

(54) MANAGING SESSIONS BETWEEN NETWORK CAMERAS AND USER DEVICES

(71) Applicant: Verizon Patent and Licensing Inc., Basking Ridge, NJ (US)

(72) Inventors: Saurabh Barnwal, Hyderabad (IN); Shiva Rama Krishna Nyshadham, Hyderabad (IN); Richa Mittal, New Delhi (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 134 days.

(21) Appl. No.: 13/792,935

(22) Filed: Mar. 11, 2013

(65) Prior Publication Data

US 2014/0253740 A1  Sep. 11, 2014

(51) Int. Cl.
*H04N 5/232* (2006.01)
*G06F 3/00* (2006.01)

(52) U.S. Cl.
CPC ............ *G06F 3/005* (2013.01); *H04N 5/23206* (2013.01)

(58) Field of Classification Search
CPC ............... H04N 5/23206; H04N 7/181; G08B 13/19656
USPC ....................................................... 348/211.3
See application file for complete search history.

(56) References Cited

U.S. PATENT DOCUMENTS

| | | | |
|---|---|---|---|
| 8,448,073 B2 * | 5/2013 | Nimon et al. ................. | 715/753 |
| 8,538,232 B2 * | 9/2013 | Chandra ....................... | 386/210 |
| 8,922,658 B2 * | 12/2014 | Galvin .......................... | 348/159 |
| 2011/0109717 A1 * | 5/2011 | Nimon et al. .............. | 348/14.09 |
| 2012/0113265 A1 * | 5/2012 | Galvin .......................... | 348/159 |

\* cited by examiner

*Primary Examiner* — Ahmed A Berhan (57) ABSTRACT

A server is configured to receive, from a user device, a first connection request including a request for a list of one or more camera devices connected to the server; establish a first channel, between the user device and the server, based on receiving the first connection request; provide the list of one or more camera devices to the user device via the first channel; receive a second connection request identifying a particular camera device of the one or more camera devices; establish a second channel based on receiving the second connection request; and provide the second connection request to the particular camera device via the second channel. A third channel may circumvent the server, and may be used to provide content, captured by the particular camera device, to the user device independently of the server.

20 Claims, 6 Drawing Sheets

MASTER SESSION INFORMATION
510

| User Device IP Address 511 | Security Token 512 | Authentication Key 513 | Camera ID 514 | Session ID 515 | Request Channel #1 ID 516 | Request Channel #2 ID 517 |
|---|---|---|---|---|---|---|
| User device IP Address 1 | Security Token 1 | Authorization Key 1 | Camera ID 1 | Session ID #1 | Request Channel #1 ID 1 | Request Channel #2 ID 1 |
| User device IP Address 2 | Security Token 2 | Authorization Key 2 | Camera ID 2 | Session ID #2 | Request Channel #1 ID 2 | Request Channel #2 ID 2 |
| User device IP Address 3 | Security Token 3 | Authorization Key 3 | Camera ID 3 | Session ID #3 | Request Channel #1 ID 3 | Request Channel #2 ID 3 |

CAMERA SESSION INFORMATION
520
Camera ID = 123; Max sessions = 5

| Response Channel ID 521 | User device IP Address 522 | Authorization Key 523 | Session ID 524 | Request Channel #2 ID 525 |
|---|---|---|---|---|
| Response Channel ID 1 | User device IP Address 1 | Authorization Key 1 | Session ID #1 | Request Channel #2 ID 1 |
| Response Channel ID 2 | User device IP Address 2 | Authorization Key 2 | Session ID #2 | Request Channel #2 ID 2 |
| Response Channel ID 3 | User device IP Address 3 | Authorization Key 3 | Session ID #3 | Request Channel #2 ID 3 |
| Response Channel ID 4 | User device IP Address 4 | Authorization Key 4 | Session ID #4 | Request Channel #2 ID 4 |

MANAGING SESSIONS BETWEEN NETWORK CAMERAS AND USER DEVICES

BACKGROUND

User devices may connect to network camera devices to view and/or record video captured by the network camera devices. For security, access to a network camera device may be restricted to user devices connected to the same local area network (LAN) as the network camera device.

DETAILED DESCRIPTION OF THE PREFERRED EMBODIMENTS

The following detailed description refers to the accompanying drawings. The same reference numbers in different drawings may identify the same or similar elements.

Systems and/or methods, as described herein, may permit a relay device to control a session between a user device and a network camera device (hereinafter referred to as a "camera device") that are connected to the same local area network (LAN). As a result, the relay device may control the session while allowing the camera device to restrict access to user devices connected to the same LAN as the camera device (e.g., for security purposes). Further, the relay device may control the session without receiving and/or processing audio/video related data captured by the camera device and destined for the user device, thereby preventing the relay device from processing cycles for reading and writing media packets relating to data captured by the camera device. Further, the relay device may control the session by sending a termination control message to the camera device and destined for the user device, thereby preventing the camera device from processing cycles of reading and writing media packets relating to data capture by the camera device when controlling the session.

Figure 1:
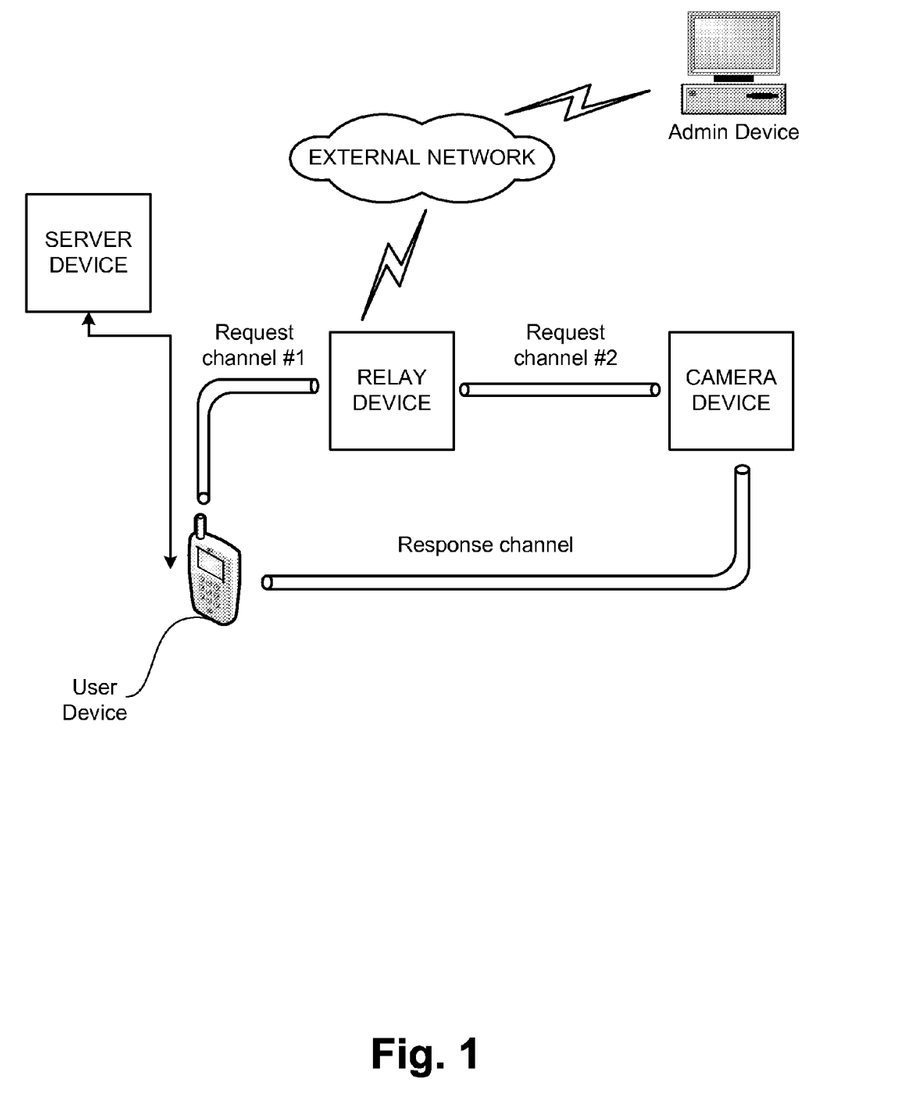
FIG. 1 illustrates an example overview of an implementation described herein.

FIG. 1 illustrates an example overview of an implementation described herein. In FIG. 1, assume that a user device, a relay device, and a camera device are connected to the same LAN. Further, assume that the camera device restricts access to user devices connected to the same LAN as the camera device and/or the relay device. As shown in FIG. 1, the user device may connect with a server device to request information (e.g., a token and/or some other information) used to access the relay device. In some implementations, the server device may provide the token based on identifying that the user device is connected to the same LAN as the relay device and/or the camera device. In some implementations, the user device may establish a request channel (e.g., request channel #1) with the relay device and may use the token to request access to the camera device via the relay device. As shown in FIG. 1, the relay device may establish another request channel (e.g., request channel #2) to forward the access request to the camera device on behalf of the user device. In some implementations, the relay device may establish request channel #2 based on determining that a threshold quantity of sessions, that the camera device can accept, has not been exceeded. In FIG. 1, assume that the quantity of sessions has not been exceeded.

In some implementations, the camera device may establish a response channel with the user device based on receiving the access request from the user device (e.g., via the relay device). In some implementations, the response channel may be used to provide content (e.g., streaming audio and/or video content) to the user device, independently of the relay device. As a result, the relay device may provide a layer of security to allow user devices, connected to the same LAN as the camera device, to access the camera device and to prevent greater than a threshold quantity of sessions to be established between the camera device and multiple user devices. In some implementations, a user of the user device may receive the content, via the user device, for security monitoring of a facility, for child monitoring, for vehicle traffic monitoring, and/or for some other purpose.

As further shown in FIG. 1, an administrative device (referred to as an "admin device") may access the relay device (e.g., using a set of credentials associated with the camera device). In FIG. 1, assume that the admin device is connected to the relay device via an external network (e.g., to a network other than the LAN associated with the camera device and the relay device). In some implementations, the admin device may provide instructions to the relay device to control the quantity of sessions established with the camera device. For example, the admin device may direct the relay device to terminate a particular session used to connect a camera device with a user device.

Additionally, or alternatively, the admin device may direct the relay device to provide some other instruction to the camera device (e.g., provide video content to a particular user device at a particular resolution, rotate the camera, power on or off a light associated with the camera, adjust the focus of the camera, etc.). As a result, a security protocol, restricting video streaming to a user device connected to the LAN, may be enforced while allowing the admin device to control the quantity of sessions established with the camera device (or to provide some other instruction to the camera device) when the admin device is not connected to the same LAN as the camera device. Further, the relay device may control the sessions without receiving and/or processing audio/video related data captured by the camera device and destined for the user device.

While systems and/or methods may be described in terms of controlling sessions established with a camera device, in practice, the systems and/or methods are not so limited. For example, the systems and/or methods may apply to controlling sessions established with some other type of device, such as a server device, a network device, a set-top box, or the like.

Figure 2:
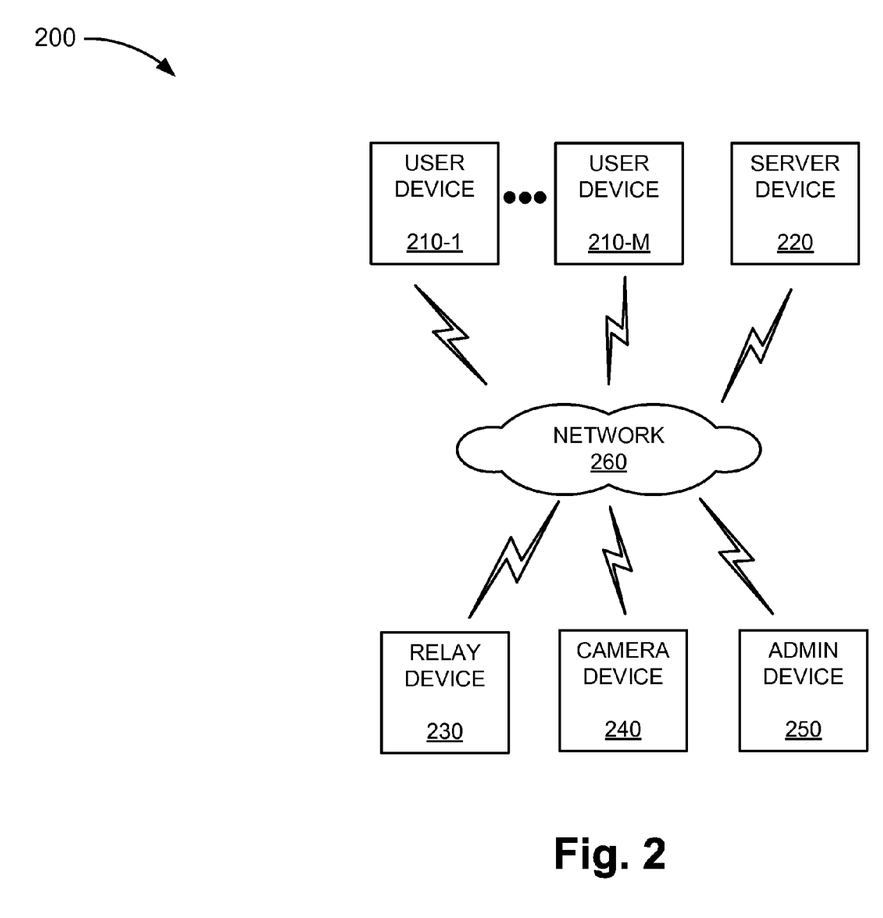
FIG. 2 illustrates an example environment in which systems and/or methods, described herein, may be implemented.

FIG. 2 is a diagram of an example environment 200 in which systems and/or methods described herein may be implemented. As shown in FIG. 2, environment 200 may include user devices 210-1, ..., 210-M (where M>1), server device 220, relay device 230, camera device 240, admin device 250, and network 260.

User device 210 may include a device capable of communicating via a network, such as network 260. For example, user device 210 may correspond to a mobile communication device (e.g., a smart phone or a personal digital assistant (PDA)), a portable computer device (e.g., a laptop or a tablet computer), a gaming device, a set-top box, a desktop computing device, or the like. In some implementations, user device 210 may request access to camera device 240 (e.g., via relay device 230) to stream content from camera device 240 (e.g., audio and/or video content).

Server device 220 may include one or more computing devices, such as a server device or a collection of server devices. In some implementations, server device 220 may store information identifying wide area network (WAN) internet protocol (IP) addresses associated with relay device 230 and/or camera device 240. In some implementations, server device 220 may provide, to user device 210, a token that user device 210 can use to access relay device 230. In some implementations, server device 220 may receive metadata identifying the WAN IP address of relay device 230 and/or camera device 240 at regular intervals (e.g., once a day, once a week, and/or some other interval), such that server device 220 stores current information identifying the WAN IP address of relay device 230 and/or camera device 240. In some implementations, the intervals may be based on a security protocol (e.g., a shorter interval may correspond to a stricter security protocol). In some implementations, server device 220 may receive, from relay device 230, metadata that server device 220 may use to identify the WAN IP. Additionally, or alternatively, server device 220 may receive the WAN IP address itself from relay device 230.

Relay device 230 may include one or more computing devices, such as a server device or a collection of server devices. In some implementations, relay device 230 may route and/or process a request to access camera device 240 on behalf of user device 210. In some implementations, relay device 230 may store information identifying sessions between user device 210, relay device 230, and/or camera device 240 and may manage the sessions between user device 210, relay device 230, and/or camera device 240 (e.g., terminate the sessions, send information/instructions regarding the sessions, etc.). Additionally, or alternatively, relay device 230 may store information identifying a threshold quantity of sessions that may be established with camera device 240 (e.g., based on a security protocol). Additionally, or alternatively, relay device 230 may store information identifying a list of camera devices 240 associated with a particular LAN and/or connected to the same LAN as relay device 230.

Camera device 240 may include one or more camera devices capable of communicating and/or streaming content via a network, such as network 260. In some implementations, camera device 240 may store a security protocol that prevents greater than a threshold quantity of sessions from being established with camera device 240. Additionally, or alternatively, camera device 240 may store a security protocol that prevents user device 210 from accessing camera device 240 when user device 210 is not connected to the same LAN as camera device 240. In some implementations, camera device 240 may establish a channel with user device 210 to provide content to user device 210 independently of relay device 230.

Admin device 250 may include a device capable of communicating via a network, such as network 260. For example, admin device 250 may correspond to a mobile communication device (e.g., a smart phone or a personal digital assistant (PDA)), a portable computer device (e.g., a laptop or a tablet computer), a desktop computing device, or the like. In some implementations, admin device 250 may communicate with relay device 230 to manage sessions established with camera device 240. As described above, admin device 250 may communicate with relay device 230 to manage the sessions when admin device 250 is not connected to the same LAN as relay device 230 and/or camera device 240. Additionally, or alternatively, admin device 250 may communicate with relay device 230 to manage the sessions when admin device 250 is connected to the same LAN as relay device 230 and/or camera device 240.

Network 260 may include one or more wired and/or wireless networks. For example, network 260 may include a cellular network, a public land mobile network (PLMN), a second generation (2G) network, a third generation (3G) network, a fourth generation (4G) network, a fifth generation (5G) network, and/or another network. Additionally, or alternatively, network 260 may include a LAN, a WAN, a metropolitan network (MAN), a telephone network (e.g., the Public Switched Telephone Network (PSTN)), an ad hoc network, a managed IP network, a virtual private network (VPN), an intranet, the Internet, a fiber optic-based network, and/or combination of these or other types of networks.

In some implementations, user device 210, server device 220, relay device 230, camera device 240, and/or admin device 250 may communicate using a hyper text transfer protocol (HTTP), an HTTP secure (HTTPS), a transmission control protocol (TCP), or some other type of protocol.

The quantity of devices and/or networks, illustrated in FIG. 2, is not limited to what is shown. In practice, there may be additional devices and/or networks; fewer devices and/or networks; different devices and/or networks; or differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections. In some implementations, devices of environment 200 may directly or indirectly interconnect via one or more network devices, such as routers, switches, gateways, etc.

Figure 3:
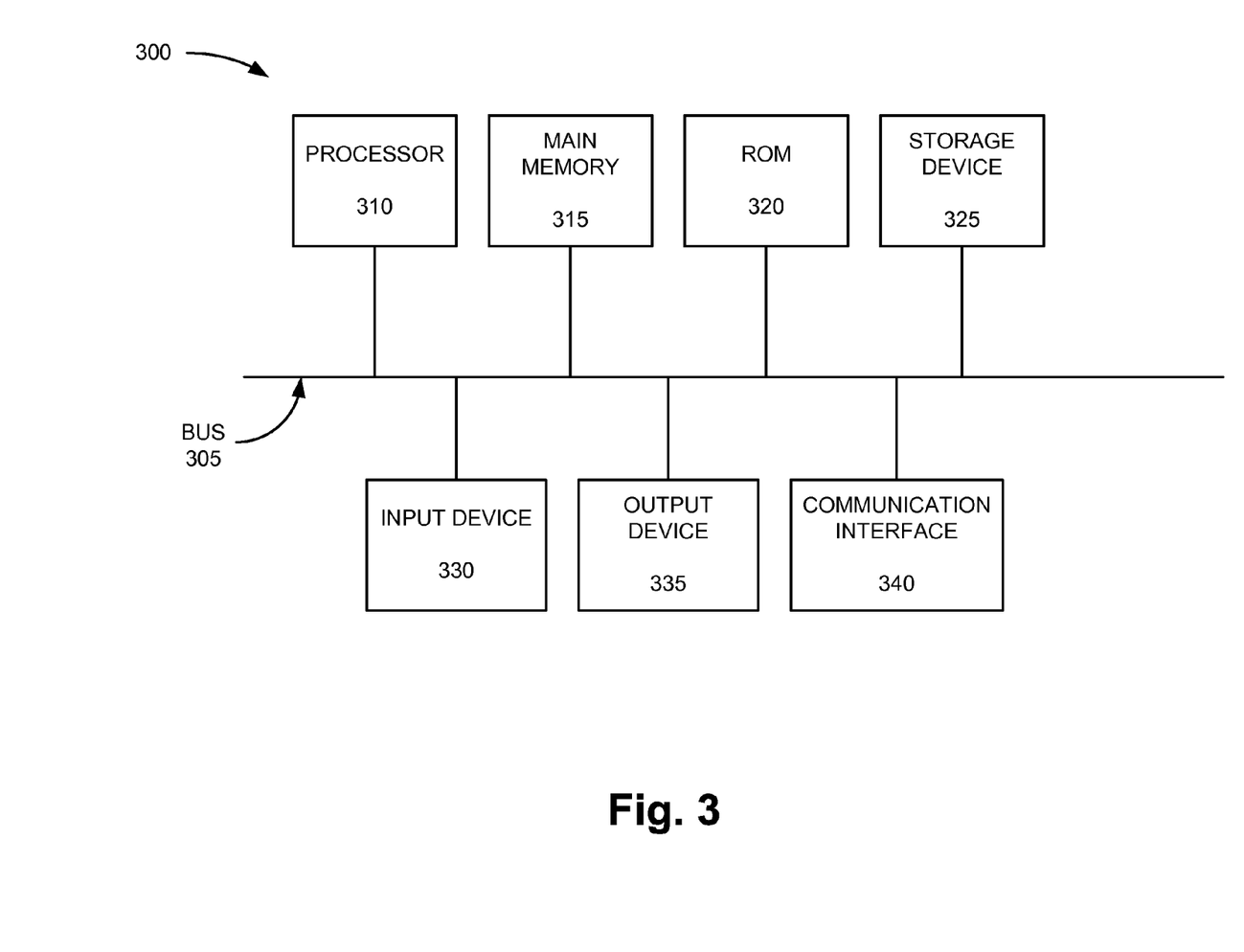
FIG. 3 illustrates example components of a device that may be used within the environment of FIG. 2.

FIG. 3 illustrates example components of a device 300 that may be used within environment 200 of FIG. 2. Device 300 may correspond to user device 210, server device 220, relay device 230, camera device 240, and/or admin device 250. Each of user device 210, server device 220, relay device 230, camera device 240, and/or admin device 250 may include one or more devices 300 and/or one or more components of device 300.

As shown in FIG. 3, device 300 may include a bus 305, a processor 310, a main memory 315, a read only memory (ROM) 320, a storage device 325, an input device 330, an output device 335, and a communication interface 340.

Bus 305 may include a path that permits communication among the components of device 300. Processor 310 may include a processor, a microprocessor, an application-specific integrated circuit (ASIC), a field programmable gate array (FPGA), or another type of processor that interprets and executes instructions. Main memory 315 may include a random access memory (RAM) or another type of dynamic storage device that stores information or instructions for execution by processor 310. ROM 320 may include a ROM device or another type of static storage device that stores static information or instructions for use by processor 310. Storage device 325 may include a magnetic storage medium, such as a hard disk drive, or a removable memory, such as a flash memory.

Input device 330 may include a component that permits an operator to input information to device 300, such as a control button, a keyboard, a keypad, or another type of input device. Output device 335 may include a component that outputs information to the operator, such as a light emitting diode (LED), a display, or another type of output device. Communication interface 340 may include any transceiver-like mechanism that enables device 300 to communicate with other devices or networks. In some implementations, communication interface 340 may include a wireless interface, a wired interface, or a combination of a wireless interface and a wired interface.

Device 300 may perform certain operations, as described in detail below. Device 300 may perform these operations in response to processor 310 executing software instructions contained in a computer-readable medium, such as main memory 315. A computer-readable medium may be defined as a non-transitory memory device. A memory device may include memory space within a single physical storage device or memory space spread across multiple physical storage devices.

The software instructions may be read into main memory 315 from another computer-readable medium, such as storage device 325, or from another device via communication interface 340. The software instructions contained in main memory 315 may direct processor 310 to perform processes that will be described later. Alternatively, hardwired circuitry may be used in place of or in combination with software instructions to implement processes described herein. Thus, implementations described herein are not limited to any specific combination of hardware circuitry and software.

In some implementations, device 300 may include additional components, fewer components, different components, or differently arranged components than are illustrated in FIG. 3.

Figure 4:
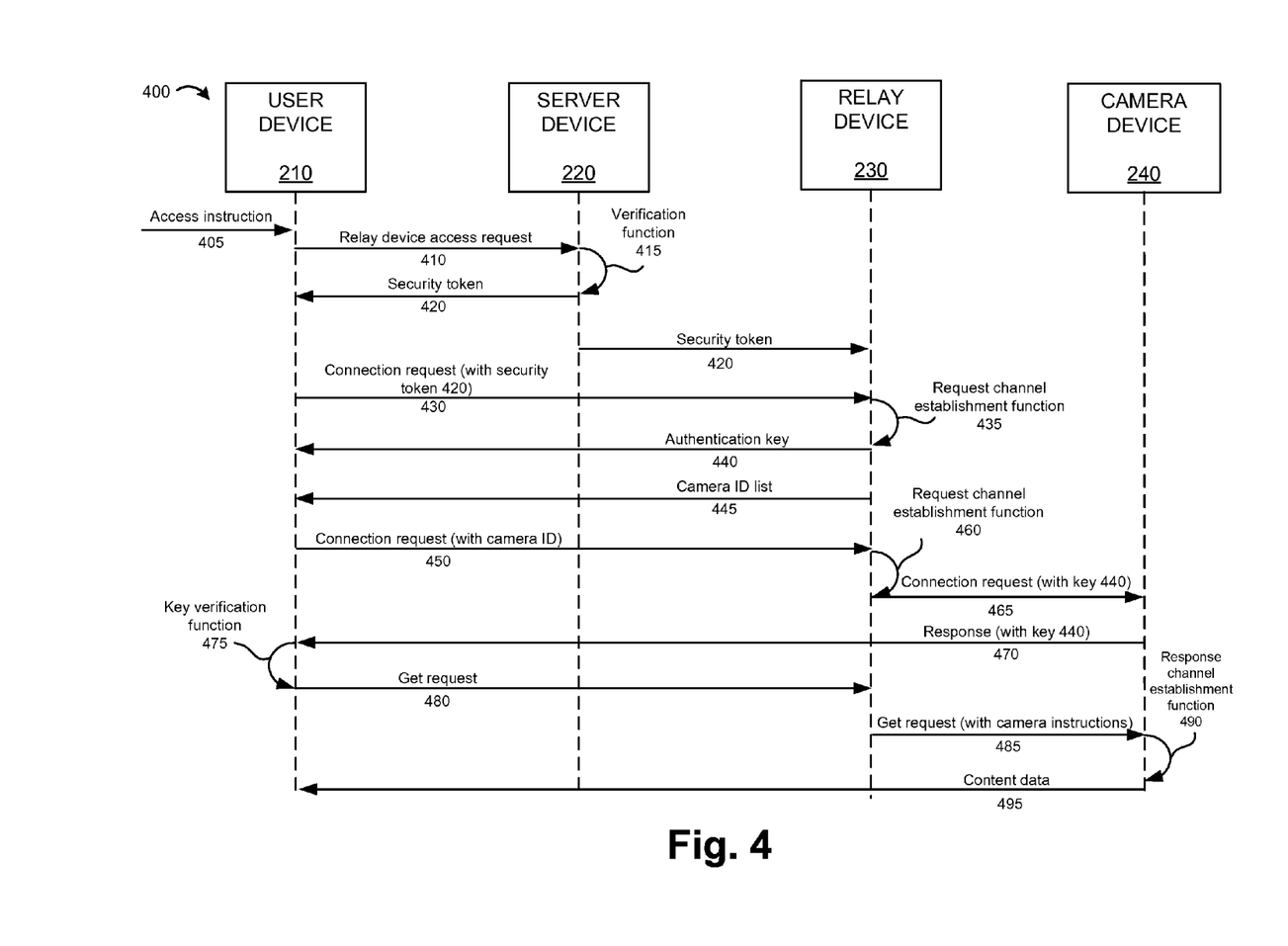
FIG. 4 illustrates a call flow diagram of example operations capable of being performed by an example portion of the environment of FIG. 2.

FIG. 4 illustrates a call flow diagram of example operations capable of being performed by an example portion 400 of environment 200. As shown in FIG. 4, portion 400 may include user device 210, server device 220, relay device 230 and camera device 240. User device 210, server device 220, relay device 230 and camera device 240 may include components and/or perform functions described above in connection with, for example, one or more of FIGS. 1-3. FIG. 4 may correspond to example operations to establish a session between user device 210 and camera device 240 and to control sessions established with camera device 240.

In FIG. 4, assume that camera device 240 uses relay device 230 to restrict access to camera device 240 to user devices 210 that are connected to the same LAN as camera device 240. For example, relay device 230 may connect with camera device 240, via the same LAN (e.g., via a router), and may store an identifier (ID) of camera device 240 to indicate that access to camera device 240 is restricted to user devices 210 that are connected to the same LAN.

In some implementations, user device 210 may receive an instruction to access camera device 240 (e.g., access instruction 405) from a user of user device 210 (e.g., via the selection of an application of user device 210). For example, the user may select the application in order to receive (e.g., via user device 210) content captured and/or stored by camera device 240, such as live streaming video content and/or some other content captured and/or stored by camera device 240.

In some implementations, user device 210 may provide relay device access request 410 to server device 220 based on receiving access instruction 405. In some implementations, user device 210 may provide relay device access request 410 to request a security token used to access relay device 230. As described above, relay device 230 may regulate to access to camera device 240.

As shown in FIG. 4, server device 220 may perform verification function 415 to determine whether user device 210 and relay device 230 (and hence camera device 240) are connected to the same LAN. In some implementations, server device 220 may determine that user device 210 and relay device 230 are connected to the same LAN when the respective WAN IP addresses of user device 210 and relay device 230 are equivalent (e.g., when the WAN IP addresses are the same).

In some implementations, server device 220 may determine a WAN IP address of user device 210 and a WAN IP address of relay device 230. For example, as described above, server device 220 may receive metadata, from relay device 230, that identifies the WAN IP address of relay device 230. Additionally, or alternatively, server device 230 may perform a domain name server (DNS) query to identify a WAN IP address of user device 210 and/or a WAN IP address of relay device 230. Additionally, or alternatively, server device 220 may determine a WAN IP address of user device 210 and/or a WAN IP address of relay device 230 using some other technique.

In some implementations (e.g., when server device 220 determines that user device 210 is not connected to the same LAN as relay device 230 and camera device 240), server device 220 may send an indication to user device 210 (e.g., a connection failure indication or some other indication) that user device 210 is not connected to the same LAN as relay device 230 and camera device 240. Additionally, or alternatively, server device 220 may prevent user device 210 from accessing camera device 240 based on determining that user device 210 is not connected to the same LAN as relay device 230 and camera device 240. For example, server device 220 may not provide a security token to user device 210 thereby preventing user device 210 from accessing relay device 230 and, in turn, from accessing camera device 240.

In some implementations, server device 220 may also send a notification that user device 210 has been prevented from accessing camera device 240. In some implementations, the notification may include a message (e.g., for display on user device 210) that informs a user of user device 210 that access to camera device 240 has been prevented since user device 210 is not connected to the same LAN as relay device 230 and camera device 240. Additionally, or alternatively, the notification may include a message that informs the user of user device 210 that access to camera device 240 may be granted when user device 210 connects to the same LAN as relay device 230 and camera device 240.

In FIG. 4, assume that server device 220 determines that user device 210, relay device 230, and camera device 240 are connected to the same LAN. Given this assumption, server device 220 may provide security token 420 to user device 210 and provide security token 420 to relay device 230. In some implementations, security token 420 may include a string of characters of any length or format. Additionally, or alternatively, server device 220 may provide an indication, to user device 210, that user device 210 is connected to the same LAN as relay device 230 and camera device 240.

In some implementations, user device 210 may provide connection request 430 to relay device 230 based on receiving security token 420 and/or the indication that user device 210 is connected to the same LAN as relay device 230 and camera device 240. In some implementations, user device 210 may provide connection request 430 to request access to relay device 230. As shown in FIG. 4, connection request 430 may include security token 420. In some implementations, connection request 430 may include an IP address (e.g., a LAN IP address) and/or an identifier of user device 210. In some implementations, relay device 230 may perform request channel establishment function 435 based on receiving connection request 430 from user device 210. In some implementations, relay device 230 may establish a request channel (e.g., request channel #1) with user device 210 based on verifying that the security token 420 received from user device 210 is the same as (e.g. equivalent to) the security token 420 received from server device 220. For example, relay device 230 may verify that the security token 420 received from user device 210 is the same as the security token 420 received from server device 220 when the string of characters in each token match. In some implementations, the request channel may correspond to request channel #1 as shown in FIG. 1.

In some implementations, the request channel may be used, for example, to allow user device 210 and relay device 230 to communicate. For example, relay device 230 may provide, to user device 210 (e.g., using the request channel), authentication key 440 and a list of IDs (e.g., camera ID list 445) identifying one or more camera devices 240 connected to the same LAN and having available sessions (e.g., based on information identifying a threshold quantity of sessions that camera device 240 may allow). In some implementations, relay device 230 may limit the camera devices 240 in the camera ID list 445 based on the particular user device 210 such that only a subset of camera devices 240 that have available sessions are able to be accessed by the particular user device 210. In FIG. 4, assume that camera ID list 445 includes the ID of the camera device 240 shown in FIG. 4.

In some implementations, a user of user device 210 may select a particular camera device 240 to access (e.g., a particular camera device 240 from which the user of user device 210 may wish to receive content captured and/or stored by the particular camera device 240). For example, the user may select a particular camera ID included in camera ID list 445. In some implementations, user device 210 may receive a selection of the particular camera ID via a user interface of user device 210. In some implementations, user device 210 may provide connection request 450 to relay device 230 (e.g., based on receiving the selection of the particular camera ID). As shown in FIG. 4, connection request 450 may include the particular camera ID. Additionally, connection request 450 may include an IP address and/or an identifier of user device 210. In FIG. 4, assume that the particular camera ID identifies the camera device 240 shown in FIG. 4.

In some implementations, relay device 230 may perform request channel establishment function 460 based on receiving connection request 450. In some implementations, relay device 230 may perform request channel establishment function 460 to establish a channel (e.g., request channel #2) between relay device 230 and camera device 240 (e.g., the particular camera device 240 associated with the particular camera ID included in connection request 450). In some implementations, the request channel, associated with request channel establishment function 460, may correspond to request channel #2 as shown in FIG. 1. In some implementations, the request channel may be used to allow relay device 230 to communicate with camera device 240. For example, relay device 230 may provide, to camera device 240 (e.g., using the request channel), connection request 465 including authentication key 440. In some implementations, connection request 465 may also include an IP address (e.g., a LAN IP address) and/or an identifier of user device 210.

As shown in FIG. 4, camera device 240 may provide response 470 based on receiving authentication key 440. In some implementations, camera device 240 may provide response 470 as part of a request to establish a response channel between camera device 240 and user device 210. As described in greater detail below, the response channel may be used to allow user device 210 and camera device 240 to communicate (e.g., to allow user device 210 to receive content captured and/or stored by camera device 240). In some implementations, the response channel may circumvent relay device 230.

In some implementations, camera device 240 may identify user device 210 based on information included in connection request 465 (e.g., an IP address and/or an identifier of user device 210). As shown in FIG. 4, response 470 may include authorization key 440. In some implementations, user device 210 may perform key verification function 475 (e.g., based on receiving response 470) to verify that the authorization key 440, received by relay device 230, is the same as (e.g., equivalent to) the authorization key received by camera device 240. In some implementations, user device 210 may provide get request 480 to relay device 230 (e.g., via the request channel between user device 210 and relay device 230) based on determining that the authorization key 440, received by relay device 230, is equivalent to the authorization key received by camera device 240.

In some implementations, get request 480 may include a request to access camera device 240 to receive content captured and/or stored by camera device 240. In some implementations, relay device 230 may provide get request 485 to camera device 240 based on receiving get request 480. In some implementations, get request 485 may include get request 480 and may additionally include instructions for camera device 240 (e.g., instructions that direct camera device 240 to provide content at a particular resolution, a bit rate, a time index, etc.). In some implementations, relay device 230 may determine the instructions based on the type of user device 210. For example, one instruction may direct camera device 240 to provide content at a particular resolution for a first type of user device 210 (e.g., a smart phone), whereas another instruction may direct camera device 240 to provide content at a different resolution for a second type of user device 210 (e.g., a desktop computing device). In some implementations, relay device 230 may identify the type of user device 210 based on information stored in a user agent header field received by relay device 230 (e.g., when user device 210 provides connection request 430, connection request 450, and/or get request 480).

As shown in FIG. 4, camera device 240 may perform response channel establishment function 490 based on receiving get request 485. In some implementations, the response channel, associated with response channel establishment function 490, may correspond to the response channel shown in FIG. 1. In some implementations, the response channel may be used to allow camera device 240 and user device 210 to communicate independently of relay device 230. For example, camera device 240 may provide, to user device 210, content data 495. In some implementations, content data 495 may correspond to data associated with content captured and/or stored by camera device 240, such as live-streaming video content, live-streaming audio content, previously recorded video content, previously recorded audio content, and/or some other content. In some implementations, relay device 230 may not receive content data 495, thereby alleviating relay device 230 from wasting processing cycles for reading and writing packets relating to content data 495.

In some implementations, user device 210, relay device 230, and/or admin device 250 may terminate a connection between user device 210 and camera device 240 (e.g., to stop data streaming). In some implementations, termination of the connection between user device 210 and camera device 240 may terminate corresponding sessions associated with request channel #1, request channel #2, and/or the response channel. In some implementations, request channel #1, request channel #2, and/or the response channel may be an HTTP connection, an HTTPS connection, or some other type of connection.

While a particular series of operations and/or data flows have been described above with regard to FIG. 4, the order of the operations and/or data flows may be modified in other implementations. Further, non-dependent operations may be performed in parallel. For example, response channel establishment function 490 may be performed based on receiving connection request 465 or may be performed based on some receiving some other data.

In some implementations, the call flow of FIG. 4 may include some additional data flows not shown in FIG. 4. For example, relay device 230 may store information identifying user devices 210 connected to camera devices 240, session IDs for request channels and/or response channels, and/or some other information to allow relay device 230 to identify particular sessions to terminate, for example, when relay device 230 terminates a connection between user device 210 and camera device 240 (e.g., when user device 210 and/or admin device 250 directs relay device 230 to terminate the connection and/or when relay device 230 determines that a greater than a threshold quantity of sessions is established with camera device 240).

Figure 5:
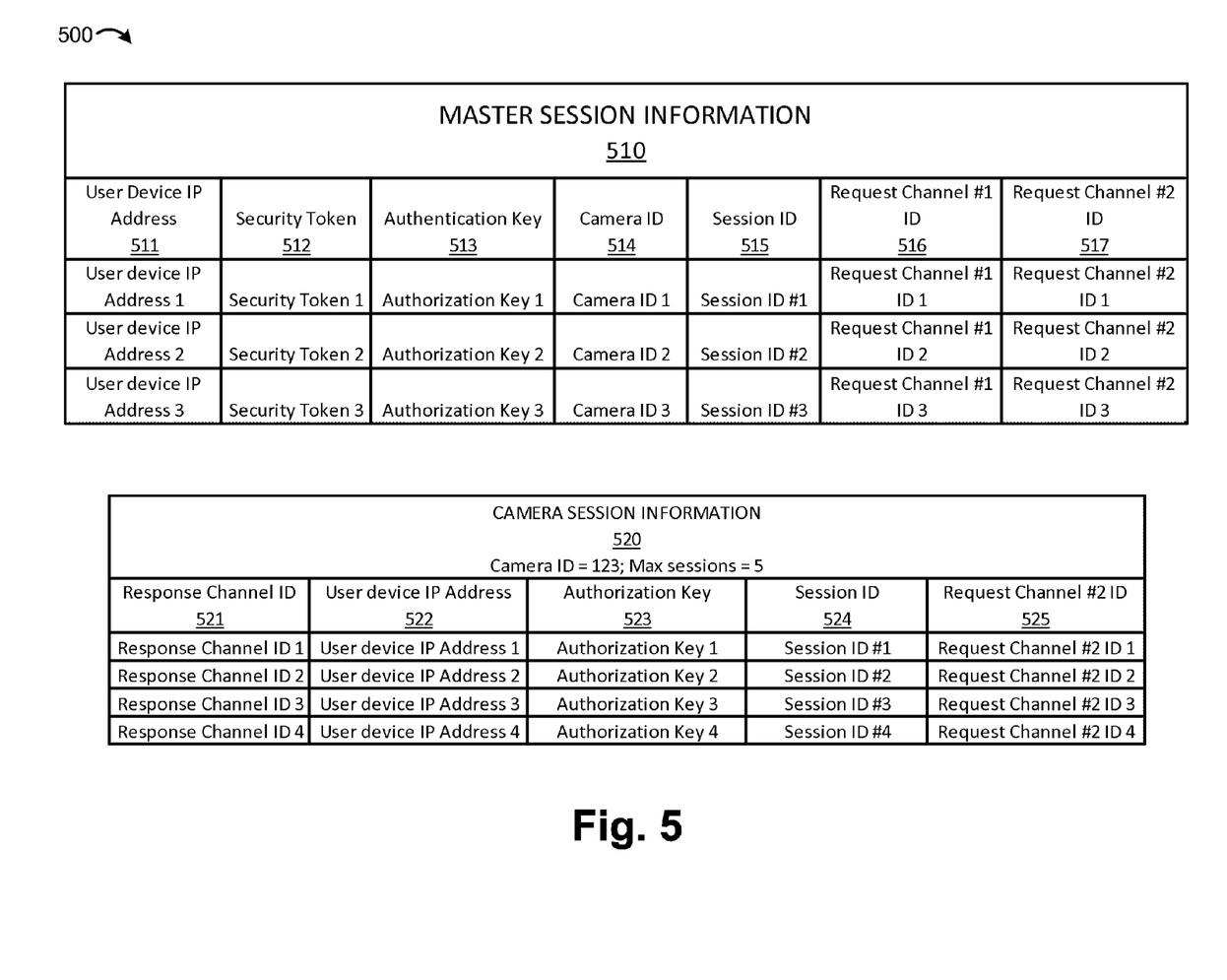
FIG. 5 illustrates an example data structure that may be stored by one or more devices in the environment of FIG. 2.

FIG. 5 illustrates an example data structure 500 that may be stored by one or more devices in environment 200. In some implementations, data structure 500 may be stored in a memory of relay device 230. In some implementations, data structure 500 may be stored in a memory separate from, but accessible by, relay device 230. In some implementations, data structure 500 may be stored by some other device in environment 200, such as user device 210, server device 220, camera device 240, and/or admin device 250. A particular instance of data structure 500 may contain different information and/or fields than another instance of data structure 500.

As shown in FIG. 5, data structure 500 may include master session information field 510 and camera session information field 520.

Master session information field 510 may store information identifying session information for request and response channels connected between user device 210, relay device 230, and/or camera device 240. As shown in FIG. 5, master session information field 510 may include user device IP address field 511, security token field 512, authentication key field 513, camera ID field 514, request channel #1 ID field 515, request channel #2 field 516, and response channel ID field 517.

User device IP address field 511 may store information identifying an IP address of a particular user device 210 that requests to access camera device 240. For example, relay device 230 may store, in user device IP address field 511, the IP address of user device 210 when user device 210 provides connection request 430, as described above. In some implementations, information stored by user device IP address field 511 may include an IP address (e.g., a LAN IP address) or some other type of network address.

Security token field 512 may store information identifying a token received by relay device 230 from user device 210 (e.g., as part of connection request 430) and/or from server device 220. In some implementations, information stored by security token field 512 may correspond to security token 420. For example, relay device 230 may store, in security token field 512, information identifying security token 420. In some implementations, security token field 512 may store a token in the form of a string of characters having any length and any format. In some implementations, relay device 230 may use information, stored by security token field 512, to compare a security token received by user device 210 with a security token received by server device 220 (e.g., to verify that the security token received by user device 210 matches the security token received by server device 220).

Authentication key field 513 may store information identifying an authentication key generated by relay device 230 (e.g., when relay device 230 receives connection request 430 and performs request channel establishment function 435 to form the authentication key, as described above). In some implementations, information stored by authentication field 513 may correspond to authentication key 440. For example, relay device 230 may store, in authentication key field 513, information identifying authentication key 440. In some implementations, authentication key field 513 may store a key in the form of a string of characters having any length and any format.

Camera ID field 514 may store information identifying a particular camera device 240 that user device 210 requests to access (e.g., as part of connection request 450). For example, relay device 230 may store, in camera ID field 514, the ID of camera device 240 when user device 210 provides connection request 450, as described above. In some implementations, camera ID field 514 may store an identifier of camera device 240 in the form of a string of characters having any length and any format.

Session ID field 515 may store information identifying a session between user device 210, relay device 230, and camera device 240. For example, relay device 230 may store, in session ID field 515, a session ID when relay device 230 performs request channel establishment function 435 to establish a request channel between user device 210 and relay device 230, and/or when relay device 230 performs request channel establishment function 460 to establish a request channel between relay device 230 and camera device 240 In some implementations, session ID field 515 may store a session ID in the form of a unique string of characters having any length and any format.

Request channel #1 ID field 516 may store information identifying a communication channel between user device 210 and relay device 230. For example, relay device 230 may store, in request channel #1 ID field 516, request channel communication parameters when relay device 230 performs request channel establishment function 435 to establish a request channel between user device 210 and relay device 230. For example, request channel #1 ID field 516 may store communication channel related information associated with HTTP/HTTPS/TCP connection parameters.

Request channel #2 ID field 517 may store information identifying a communication channel between relay device 230 and camera device 240. For example, relay device 230 may store, in request channel #2 ID field 517, communication channel parameters when relay device 230 performs request channel establishment function 460 to establish a request channel between relay device 230 and camera device 240. For example, request channel #2 ID field 517 may store communication channel related information associated with HTTP/HTTPS/TCP connection parameters. In some implementations, master session information field 510 may include additional fields not shown in FIG. 5. For example, master session information field 510 may include information identifying a TCP socket associated with user device 210, relay device 230, and/or camera device 240.

In some implementations, information stored by master session information field 510 may be used to identify particular sessions that relay device 230 may terminate in order to disconnect user device 210 from camera device 240. For example, relay device 230 may identify a particular session to terminate based on an instruction (e.g., received from admin device 250) to disconnect a particular user device 210 from camera device 240. Additionally, or alternatively, relay device 230 may identify a particular session to terminate to disconnect a particular user device 210 from camera device 240 when a threshold quantity of sessions, that camera device 240 may establish with multiple user devices 210, is met or exceeded.

Additionally, or alternatively, information stored by master session information field 510 may be used to identify particular sessions that relay device 230 may reestablish in the event that a connection between user device 210 and camera device 240 is interrupted, for example, as a result of a network outage or a similar type of event. For example, relay device 230 may reestablish request and/or response channels with user device 210 and camera device 240 using information stored by master session information field 510 that identifies sessions that are to be reestablished and/or TCP sockets to use to reestablish the sessions. Additionally, or alternatively, relay device 230 may provide, to camera device 240, information that allows camera device 240 to reestablish a request and/or response channel with user device 210 (e.g., a session ID, associated with the request and/or response channel, an IP address (e.g., a LAN IP address) of the user device 210 to reestablish the request and/or response channel, etc.).

In some implementations, data structure 500 may include a camera session information field 520 for each camera device 240 connected to relay device 230. As shown in FIG. 5, camera session information field 520 may include a camera identifier to identify a particular camera device 240 associated with a particular camera session information field 520. In some implementations, camera session information field 520 may store a camera ID in the form of a string of characters having any length and any format. Camera session information field 520 may also include information identifying a threshold quantity of sessions (e.g., max sessions) that camera device 240 may establish with multiple user devices 210. In some implementations, camera session information field 520 may store instructions that relay device 230 may provide to camera device 240 (e.g., as part of get request 485). For example, camera session information field 520 may store instructions to direct camera device 240 to provide content at a particular resolution based on the type of user device 210, as described above with respect to get request 485. In some implementations, an operator of relay device 230 and/or camera device 240 may provide the instructions to relay device 230 for storage in camera session information field 520.

In some implementations, camera session information field 520 may further include response channel ID field 521, user device IP address field 522 and authorization key field 523.

Response channel ID field 521 may store information identifying a communication channel between user device 210 and camera device 240. For example, relay device 230 may store, in response channel ID field 521, communication channel parameters when camera device 240 performs response channel establishment function 490 to establish a response channel between user device 210 and camera device 240. In some implementations, relay device 230 may receive an indication that the request channel has been established and may receive communication channel parameters, associated with the request channel, when camera device 240 establishes the response channel. In some implementations, response channel ID field 521 may store the communication channel parameters. In some implementations, the communication channel parameters, stored by response channel ID field 521, may be associated with HTTP/HTTPS/TCP connection parameters.

User device IP address field 522 may store information identifying an IP address (e.g., a LAN IP address) of a particular user device 210 that requests to access camera device 240. For example, relay device 230 may store, in user device IP address field 522, the IP address of user device 210 when user device 210 provides connection request 430, as described above. In some implementations, information stored by user device IP address field 522 may include an IP address or some other type of network address.

Authentication key field 523 may store information identifying an authentication key generated by relay device 230 (e.g., when relay device 230 receives connection request 430 and performs request channel establishment function 435 to form the authentication key, as described above). In some implementations, information stored by authentication field 513 may correspond to authentication key 440. For example, relay device 230 may store, in authentication key field 523, information identifying authentication key 440. In some implementations, authentication key field 523 may store a key in the form of a string of characters having any length and any format.

Session ID field 524 may store information identifying a session between user device 210, relay device 230, and camera device 240. For example, relay device 230 may store, in session ID field 524, a session ID when relay device 230 performs request channel establishment function 460 to establish a request channel between relay device 230 and camera device 240, and/or when camera device 240 performs response channel establishment function 490. In some implementations, session ID field 524 may store a session ID in the form of a unique string of characters having any length and any format.

Request channel #2 ID field 525 may store information identifying a communication channel between relay device 230 and camera device 240. For example, relay device 230 may store, in request channel #2 ID field 525, request channel #1 communication parameters when relay device 230 performs request channel establishment function 460 to establish a request channel between relay device 230 and camera device 240. In some implementations, request channel #2 ID field 525 may store communication channel related information associated with HTTP/HTTPS/TCP connection parameters.

In some implementations, information stored by camera session information field 520 may allow an operator of relay device 230 and/or camera device 240 to identify a quantity of sessions established with camera device 240 and/or to identify information associated with particular user devices 210 connected to camera device 240.

While particular fields are shown in a particular format in data structure 500, in practice, data structure 500 may include additional fields, fewer fields, different fields, or differently arranged fields than are shown in FIG. 5. For example, camera session information field 520 may include some additional fields not shown in FIG. 5, such as an identifier of user device 210 and/or information identifying a TCP socket associated with user device 210, relay device 230, and/or camera device 240.

Figure 6:
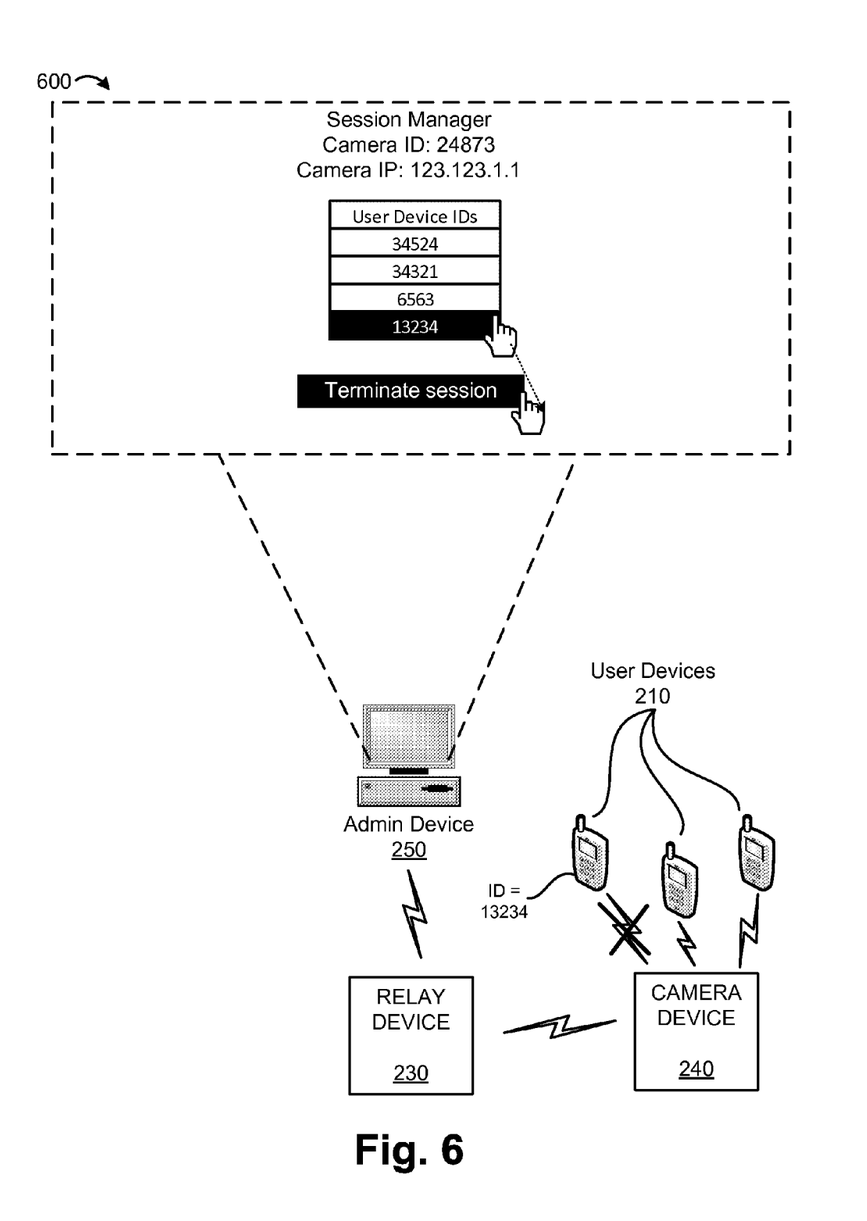
FIG. 6 illustrates an example implementation as described herein.

FIG. 6 illustrates an example implementation as described herein. In FIG. 6, assume that admin device 250 connects to relay device 230 and that admin device 250 and relay device 230 are not connected to the same LAN. Further, assume that relay device 230 and camera device 240 are connected to the same LAN and that camera device 240 connects with multiple user devices 210 via the same LAN. As shown in FIG. 6, admin device 250 may access relay device 230 to manage sessions between multiple user devices 210 and a particular camera device 240 connected to relay device 230. For example, admin device 250 may access relay device 230 via a web browser or via a user interface of admin device 250, such as interface 600, and may identify relay device 230 based on an IP address of relay device 230.

In some implementations, admin device 250 may use a set of login credentials to access a session managing function of relay device 230 and to terminate particular sessions between user device 210 and relay device 230. As shown in interface 600, a user of admin device 250 may use interface 600 to identify a particular user device 210 to disconnect from camera device 240 (e.g., based on an identifier of user device 210). As described above, relay device 230 may identify particular sessions to terminate based on information stored by data structure 500. As a result, admin device 250 may manage sessions established with relay device 230 when admin device 250 is not on the same LAN as relay device 230 and/or camera device 240. For example, admin device 250 may be used as a parental control device and/or a network administrative device to terminate streaming activity between camera device 230 and user device 210.

While a particular example is shown in FIG. 6, it will be apparent that the above description is merely an example implementation. For example, in practice, interface 600 may have a different format and appearance than what is shown in FIG. 6.

As described above, a security protocol, restricting access (e.g., audio/video streaming access) of camera device 240 to user device 210 connected to the same LAN as camera device 240, may be enforced while allowing relay device 230 (e.g., via admin device 250) to control the quantity of sessions established with the camera device 240 when admin device 250 is not connected to the same LAN as camera device 240. For example, as described above, relay device 230 may store session information for request and response channels connecting user device 210, relay device 230, and camera device 240. Further, admin device 250 may cause relay device 230 to terminate particular sessions (e.g., based on the stored session information) by sending relay device 230 with an instruction to terminate the connection between user device 210 and camera device 240.

In some implementations, relay device 230 may terminate a connection (and corresponding sessions) between user device 210 and camera device 240 based on a security protocol that identifies a threshold quantity of sessions that may be established with camera device 240. For example, relay device 230 may enforce a security protocol (e.g., without user interaction) to terminate a connection between user device 210 and camera device 240 when greater than a threshold quantity of sessions are established with camera device 240. Further, relay device 230 may control sessions established with camera device 240 without receiving and/or processing audio/video related data captured by camera device 240 and destined for user device 210.

In some implementations, relay device 230 may also send a notification that the session of user device 210 with the camera device 240 has been terminated. In some implementations, the notification may identify a reason for the termination, such as the session having been established for longer than a threshold amount of time, a higher priority user device 210 needing access to camera device 240, etc. Additionally, or alternatively, the notification may identify an instruction for a user of user device 210 to perform to reestablish the session. In some implementations, all or some sessions, associated with the connection between user device 210 and camera device 240, may be immediately terminated. For example, the response channel session may be immediately terminated while allowing a request channel session to remain open (e.g., to allow for faster reestablishment of content data flow via the response channel).

The foregoing description provides illustration and description, but is not intended to be exhaustive or to limit the possible implementations to the precise form disclosed. Modifications and variations are possible in light of the above disclosure or may be acquired from practice of the implementations.

It will be apparent that different examples of the description provided above may be implemented in many different forms of software, firmware, and hardware in the implementations illustrated in the figures. The actual software code or specialized control hardware used to implement these examples is not limiting of the implementations. Thus, the operation and behavior of these examples were described without reference to the specific software code—it being understood that software and control hardware can be designed to implement these examples based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A method comprising:
   receiving, by a server device, a first connection request from a user device,
      the first connection request including a request for a list of one or more camera devices connected to the server device and a request to establish a channel between the user device and the server device;
   establishing, by the server device, a first channel, between the user device and the server device, based on receiving the first connection request;
   providing, by the server device, the list of the one or more camera devices to the user device via the first channel;
   receiving, by the server device, a second connection request from the user device via the first channel,
      the second connection request identifying a particular camera device, of the one or more camera devices, and a request to connect to the particular camera device;
   establishing, by the server device, a second channel with the particular camera device based on receiving the second connection request; and
   providing, by the server device, the second connection request to the particular camera device via the second channel, the second connection request causing the particular camera device to establish a third channel between the particular camera device and the user device, the third channel circumventing the server device and being used to provide content, captured by the particular camera device, to the user device independently of the server device, the content being provided to the user device without being provided to the server device.

2. The method of claim 1, further comprising:
controlling a quantity of sessions established with the particular camera device.

3. The method of claim 1, further comprising:
storing a first session identifier (ID) associated with the first channel;
storing a second session ID associated with the second channel;
storing a third session ID associated with the third channel;
determining that a connection between the user device and the particular camera device is to be terminated;
identifying the first session ID, the second session ID, and the third session ID based on determining that the connection between the user device and the particular camera device is to be terminated; and
terminating sessions associated with the first channel, the second channel, and the third channel based on identifying the first session ID, the second session ID, and the third session ID.

4. The method of claim 3, further comprising:
receiving an instruction, from an administrator device connected remotely to the server device, to terminate the connection between the user device and the particular camera device,
where determining that the connection between the user device and the particular camera device is to be terminated includes determining that the connection is to be terminated based on receiving the instruction from the administrator device.

5. The method of claim 3, where determining that the connection between the user device and the particular camera device is to be terminated includes determining that the connection is to be terminated based on a security protocol that identifies a threshold quantity of sessions that can be established with the particular camera device.

6. The method of claim 1, where the server device is a first server device,
where the user device provides the first connection request to the first server device when the user device receives a security token from a second server device,
the first connection request including the security token, the method further comprising:
receiving the security token from the user device as part of the first connection request;
receiving the security token from the second server device; and
determining that the security token received from the user device matches the security token received from the second server device,
where establishing the first channel includes establishing the first channel further based on determining that the security token received from the user device matches the security token received from the second server device.

7. The method of claim 6, where the security token is provided by the second server device to the user device or the first server device based on the second server device determining that the user device and the first server device are connected to a common local area network.

8. The method of claim 1, further comprising:
providing an authentication key, to the user device via the first channel, based on establishing the first channel; and
providing the authentication key to the particular camera device based on providing the second connection request to the particular camera device,
the authentication key being provided to the user device by the particular camera device after providing the second connection request to the particular camera device,
the third channel being established by the particular camera device when the user device determines that the authentication key, received from the server device, matches the authentication key received from the particular camera device.

9. The method of claim 1, where providing the second connection request to the particular camera device includes providing an instruction to direct the particular camera device to provide the content to the user device at a particular resolution or bit rate based on a type of the user device.

10. A server device comprising:
a memory to store instructions; and
a processor to execute the instructions to:
receive a first connection request from a user device,
the first connection request including a request for a list of one or more camera devices connected to the server device and a request to establish a channel between the user device and the server device;
establish a first channel, between the user device and the server device, based on receiving the first connection request;
provide the list of the one or more camera devices to the user device via the first channel;
receive a second connection request from the user device via the first channel,
the second connection request identifying a particular camera device, of the one or more camera devices, and a request to connect to the particular camera device;
establish a second channel with the particular camera device based on receiving the second connection request;
provide the second connection request to the particular camera device via the second channel,
the second connection request causing the particular camera device to establish a third channel between the particular camera device and the user device,
the third channel circumventing the server device and being used to provide content, captured by the particular camera device, to the user device independently of the server device,
the content being provided to the user device without being provided to the server device; and
determine whether a connection between the user device and the particular camera device is to be terminated based on a security protocol that identifies a threshold quantity of sessions that can be established with the particular camera device.

11. The server device of claim 10, where the server device is to control a quantity of sessions established with the particular camera device, and
where the processor is further to:
store a first session identifier (ID) associated with the first channel;

store a second session ID associated with the second channel;
store a third session ID associated with the third channel;
determine that Hall the connection between the user device and the particular camera device is to be terminated;
identify the first session ID, the second session ID, and the third session ID based on determining that the connection between the user device and the particular camera device is to be terminated; and
terminate sessions associated with the first channel, the second channel, and the third channel based on identifying the first session ID, the second session ID, and the third session ID.

12. The server device of claim 11, where the server device, the user device, and the particular camera device are connected to a common local area network (LAN), and where the processor is further to:
receive an instruction, from an administrator device connected remotely from the common LAN, to terminate the connection between the user device and the particular camera device,
where, when determining that the connection between the user device and the particular camera device is to be terminated, the processor is further to determine that the connection between the user device and the particular camera device is to be terminated based on receiving the instruction from the administrator device.

13. The server device of claim 11, where, when determining that the connection between the user device and the particular camera device is to be terminated, the processor is further to determine that the connection between the user device and the particular camera device is to be terminated based on the security protocol that identifies the threshold quantity of sessions that can be established with the particular camera device.

14. The server device of claim 10, where the processor is further to:
provide an authentication key, to the user device via the first channel, based on establishing the first channel; and
provide the authentication key to the particular camera device based on providing the second connection request to the particular camera device,
the authentication key being provided to the user device by the particular camera device,
the third channel being established by the particular camera device when the user device determines that the authentication key, received from the server device, matches the authentication key received from the particular camera device.

15. The server device of claim 10, where, when providing the second connection request to the particular camera device, the processor is further to provide an instruction to direct the particular camera device to provide the content to the user device at a particular resolution or bit rate based on a type of the user device.

16. A non-transitory computer-readable medium for storing instructions, the instructions comprising:
a plurality of instructions which, when executed by one or more processors associated with a server device, cause the one or more processors to:
receive a first connection request from a user device,
the first connection request including a request for a list of one or more camera devices connected to the server device and a request to establish a channel between the user device and the server device,
the first connection request being received from the user device based on the user device receiving an indication that the user device is connected to a common local area network (LAN) to which the server device is connected;
establish a first channel, between the user device and the server device, based on receiving the first connection request;
provide the list of the one or more camera devices to the user device via the first channel;
receive a second connection request from the user device via the first channel,
the second connection request identifying a particular camera device of the one or more camera devices and a request to connect to the particular camera device;
establish a second channel with the particular camera device based on receiving the second connection request; and
provide the second connection request to the particular camera device via the second channel,
the second connection request causing the particular camera device to establish a third channel between the particular camera device and the user device,
the third channel circumventing the server device and being used to provide content, captured by the particular camera device, to the user device independently of the server device,
the content being provided to the user device without being provided to the server device,
the server device being capable of controlling a quantity of sessions established with the particular camera device.

17. The non-transitory computer-readable medium of claim 16, where the instructions further comprise one or more instructions to cause the one or more processors to:
store a first session identifier (ID) associated with the first channel;
store a second session ID associated with the second channel;
store a third session ID associated with the third channel;
determine that a connection between the user device and the particular camera device is to be terminated;
identify the first session ID, the second session ID, and the third session ID based on determining that the connection between the user device and the particular camera device is to be terminated; and
terminate sessions associated with the first channel, the second channel, and the third channel based on identifying the first session ID, the second session ID, and the third session ID.

18. The non-transitory computer-readable medium of claim 17, where the server device, the user device, and the particular camera device are connected to the common LAN, and
where the instructions further comprise one or more instructions to cause the one or more processors to:
receive an instruction, from an administrator device connected remotely from the common LAN, to terminate the connection between the user device and the particular camera device,
where one or more instructions, of the plurality of instructions, to determine that the connection between the user device and the particular camera device is to be terminated comprise one or more instructions to cause the one or more processors to determine that the connection between the user device and the particular camera device is to be terminated based on receiving the instruction from the administrator device.

19. The non-transitory computer-readable medium of claim 17, where one or more instructions, of the plurality of instructions, to determine that the connection between the user device and the particular camera device is to be terminated comprise one or more instructions cause the one or more processors to determine that the connection between the user device and the particular camera device is to be terminated based on a security protocol that identifies a threshold quantity of sessions that can be established with the particular camera device.

20. The non-transitory computer-readable medium of claim 16, where the instructions further comprise one or more instructions to cause the one or more processors to:
provide an authentication key, to the user device via the first channel, based on establishing the first channel; and
provide the authentication key to the particular camera device based on providing the second connection request to the particular camera device,
the authentication key being provided to the user device by the particular camera device after providing the authentication key to the particular camera device,
the third channel being created by the particular camera device when the user device determines that the authentication key, received from the server device, matches the authentication key received from the particular camera device.

* * * * *